(12) United States Patent
Jeong

(10) Patent No.: US 9,905,137 B2
(45) Date of Patent: Feb. 27, 2018

(54) HYDROPLANING DEBRIS-FLOW SIMULATION APPARATUS

(75) Inventor: Sueng Won Jeong, Busan (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 909 days.

(21) Appl. No.: 13/618,170

(22) Filed: Sep. 14, 2012

(65) Prior Publication Data

US 2013/0263681 A1    Oct. 10, 2013

(30) Foreign Application Priority Data

Apr. 10, 2012 (KR) .................. 10-2012-0037102

(51) Int. Cl.
*G09B 23/12* (2006.01)

(52) U.S. Cl.
CPC ......... *G09B 23/12* (2013.01); *Y10T 29/49826* (2015.01)

(58) Field of Classification Search
CPC ........ G09B 23/12; G09B 25/00; G09B 23/00; G09B 23/08; G09B 23/40; G09B 25/06; G09B 25/08; G09B 19/0061; G09B 23/06; A63G 21/18; A63G 31/007; E03F 3/046; E01C 11/227; B65G 11/146; B65G 21/12; B65G 21/14; B65G 2812/082; G01C 13/006; E02B 13/00; E02B 5/00; G06F 17/5009
USPC .......................................... 73/865.6
See application file for complete search history.

(56) References Cited

U.S. PATENT DOCUMENTS

| | | | | |
|---|---|---|---|---|
| 3,541,705 | A | * | 11/1970 | Nelson .................. 434/126 |
| 5,213,547 | A | * | 5/1993 | Lochtefeld ............ 472/117 |
| 5,279,151 | A | * | 1/1994 | Coody et al. .............. 73/86 |
| 5,653,592 | A | * | 8/1997 | Davinroy ............... 434/126 |
| 2011/0028227 | A1 | * | 2/2011 | Dubois et al. ......... 472/117 |
| 2012/0258812 | A1 | * | 10/2012 | Osterman et al. ...... 472/117 |

FOREIGN PATENT DOCUMENTS

| KR | 100878139 B1 | 1/2009 |
|---|---|---|
| KR | 1020110008909 A | 1/2011 |

* cited by examiner

*Primary Examiner* — John Fitzgerald
*Assistant Examiner* — Rodney T Frank
(74) *Attorney, Agent, or Firm* — Fredrikson & Byron, P.A.

(57) ABSTRACT

Disclosed herein is a hydroplaning debris-flow simulation apparatus which includes an inclined flume provided with a plurality of water permeation units.

8 Claims, 15 Drawing Sheets

– PRIOR ART –

(a)

(b)

(c)

(d)

(e)

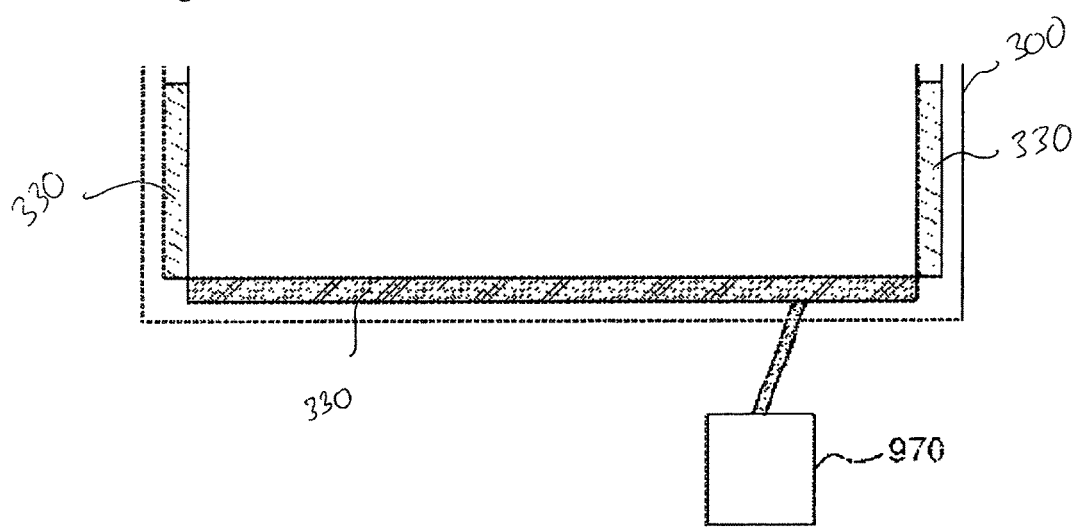

HYDROPLANING DEBRIS-FLOW SIMULATION APPARATUS

BACKGROUND OF THE INVENTION

1. Field of the Invention

The present invention relates generally to hydroplaning debris-flow simulation apparatuses and, more particularly, to a hydroplaning debris-flow simulation apparatus which can create a water layer in a flume to simulate a wet ground surface and a hydroplaning phenomenon that increase the mobility of debris-flow.

2. Description of the Related Art

One of the major causes of landslides in South Korea is rainfall. Korea's annual average precipitation is 1,274 mm and Korea has a temperate monsoon climate. In Korea, rain is concentrated in the three months from June to August by typhoons and rain falling during the rainy season, and the amount of rain that falls during this period is similar to ⅔ of the annual average precipitation. Most landslides occur in the rainy season. Thus, it can be understood that rainfall is the main cause of a landslide.

The cause of most landslides is the regional torrential rains of the summer season. In a landslide, thin soil layers slide down on top of basement rock. Particularly, in the case where the ground is unstable, debris-flow is easily caused.

Such debris-flow contains a large amount of soil mixed with boulders and moves a great distance at a comparatively high speed in a sliding manner. To understand the characteristics of debris-flow, small scale indoor flume tests have been used to conduct experiments on the engineering properties of debris-flow, for example, experiments that measures the flow rate and flow distance of fluid depending on water content of fluid, or measures the mobility of fluid depending on the constituents of a fluid, that is, the constituents of soil.

FIG. 1 is a view showing the construction of a landslide simulation apparatus according to a conventional technique.

As shown in FIG. 1, the landslide simulation apparatus that was proposed in Korean Patent Application No. 10-2008-0066805 includes a sample discharge unit, a landslide channel unit and a spread observation unit. The sample discharge unit is disposed at an upper position and contains a sample having a predetermined water content which is later discharged when necessary. The landslide channel unit is provided under the sample discharge unit and inclined at a predetermined inclination angle such that it is taller at an inlet end and the height becomes smaller in the direction of an outlet end, so that the sample that has been discharged slides down along the landslide channel unit. The spread observation unit is horizontally provided such that it is connected to the outlet of the landslide channel unit. The sample that has slid down spreads along the upper surface of the spread observation unit. Thus, the possibility of a landslide and the range and extent of damage attributable to the landslide can be measured using the landslide simulation apparatus.

However, in a debris-flow simulation test, the conventional flume test apparatus simulates rainfall using an artificial rainfall system provided above the flume. Thus, the conventional technique cannot simulate a ground surface that is wet as a result of prior rainfall.

Therefore, the conventional flume test apparatus cannot create hydroplaning on the front end of debris-flow because rainfall cannot flow downwards along the inclined surface of the flume after debris-flow has occurred. Thus, it cannot create conditions similar to the flow conditions of debris-flow caused by actual rainfall.

SUMMARY OF THE INVENTION

Accordingly, the present invention has been made keeping in mind the above problems occurring in the prior art, and an object of the present invention is to provide a hydroplaning debris-flow simulation apparatus which is configured such that a water layer is formed in a flume, thus creating the same conditions as those of actual debris-flow.

In order to accomplish the above object, in an aspect, the present invention provides a hydroplaning debris-flow simulation apparatus, including an inclined flume. The flume includes a plurality of water permeation units.

The flume may comprise a plurality of flumes arranged at positions spaced apart from each other at regular intervals or parallel to each other.

The flumes may respectively include gates provided at different positions in the flumes, each of the gates controlling discharge of debris-flow.

Each of the flumes may include a water-pressure gauge or a load cell provided on each of an upper portion, a medial portion and a lower portion of a bottom of the flume. The water-pressure gauge may measure a water pressure in the flume. The load cell may measure a load of the debris-flow.

The water permeation units may be provided in each of the flumes at positions spaced apart from each other in a longitudinal direction of the flume.

The hydroplaning debris-flow simulation apparatus may further include a water supply pump coupled to the water permeation units, the water supply pump supplying water to the water permeation units so that the water is drawn into the flume.

Each of the water permeation units may include a porous plate simulating a partially-wet ground surface, an effect of variations in subterranean water or a gush-out water phenomenon.

Each of the water permeation units may include a hollow plate simulating a ground surface wet because of rainfall.

Each of the water permeation units may include a porous plate or a hollow plate that supplies water into the flume only through a predetermined open portion, and the water permeation units may have a same structure and are provided in at least one of the flumes.

Each of the water permeation units may include a porous plate or hollow plate that supplies water into the flume only through a predetermined open portion, and the water permeation units having different structures may be combined in at least one of the flumes.

In another aspect, the present invention provides a method of manufacturing a hydroplaning debris-flow simulation apparatus, including: installing gates in respective flumes at different positions, the gates controlling discharge of debris-flow; installing a plurality of water permeation units in each of the flumes at positions spaced apart from each other in a longitudinal direction of the flume; and arranging the flumes at positions spaced apart from each other at regular intervals or parallel to each other, and installing the flumes at an angle of inclination.

In a further aspect, the present invention provides a method of simulating a landslide, including: supplying debris-flow into flumes, each of the flumes being provided with a gate at a different position and a plurality of water permeation units; supplying water to the water permeation units and forming a water layer in each of the flumes; opening the gates at a same time and measuring a flow rate of debris-flow depending on an amount of debris-flow, a distance that the debris-flow moves, and a state of the debris-flow attributable to hydroplaning.

In a hydroplaning debris-flow simulation apparatus according to the present invention, water is supplied into a flume so that the formation of a water layer can be simulated in the flume. Depending on the way that water is supplied, a partially-wet ground surface, the effect of variation of subterranean water, and a gush-out water phenomenon can be simulated in the flume, or a ground surface wet because of rainfall can be simulated. Therefore, the apparatus of the present invention can create conditions approximating those of an actual debris-flow.

BRIEF DESCRIPTION OF THE DRAWINGS

The above and other objects, features and advantages of the present invention will be more clearly understood from the following detailed description taken in conjunction with the accompanying drawings, in which:

FIGS. 6a through 6d are views showing several examples of a water permeation unit used in the hydroplaning debris-flow simulation apparatus according to the present invention;

FIG. 8b is of views showing the construction of a debris-flow supply unit shown in FIG. 8a;

DESCRIPTION OF THE PREFERRED EMBODIMENTS

Figure 1:
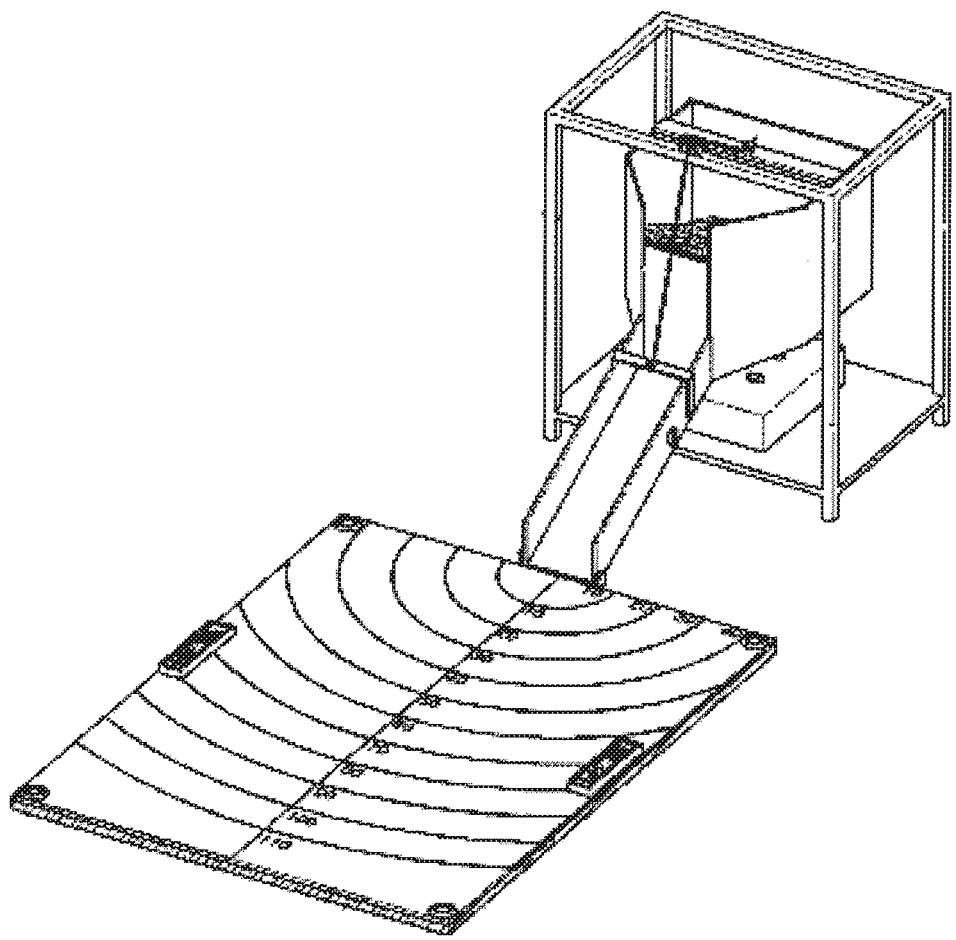
FIG. 1 is a view showing the construction of a landslide simulation apparatus according to a conventional technique.

Hereinafter, a preferred embodiment of the present invention will be described in detail with reference to the attached drawings. Reference now should be made to the drawings, in which the same reference numerals are used throughout the different drawings to designate the same or similar components. If in the specification, detailed descriptions of well-known functions or configurations would unnecessarily obfuscate the gist of the present invention, the detailed descriptions will be omitted.

A hydroplaning debris-flow simulation apparatus according to the present invention includes an inclined flume. Especially, the flume may include a plurality of water permeation units.

Figure 2:
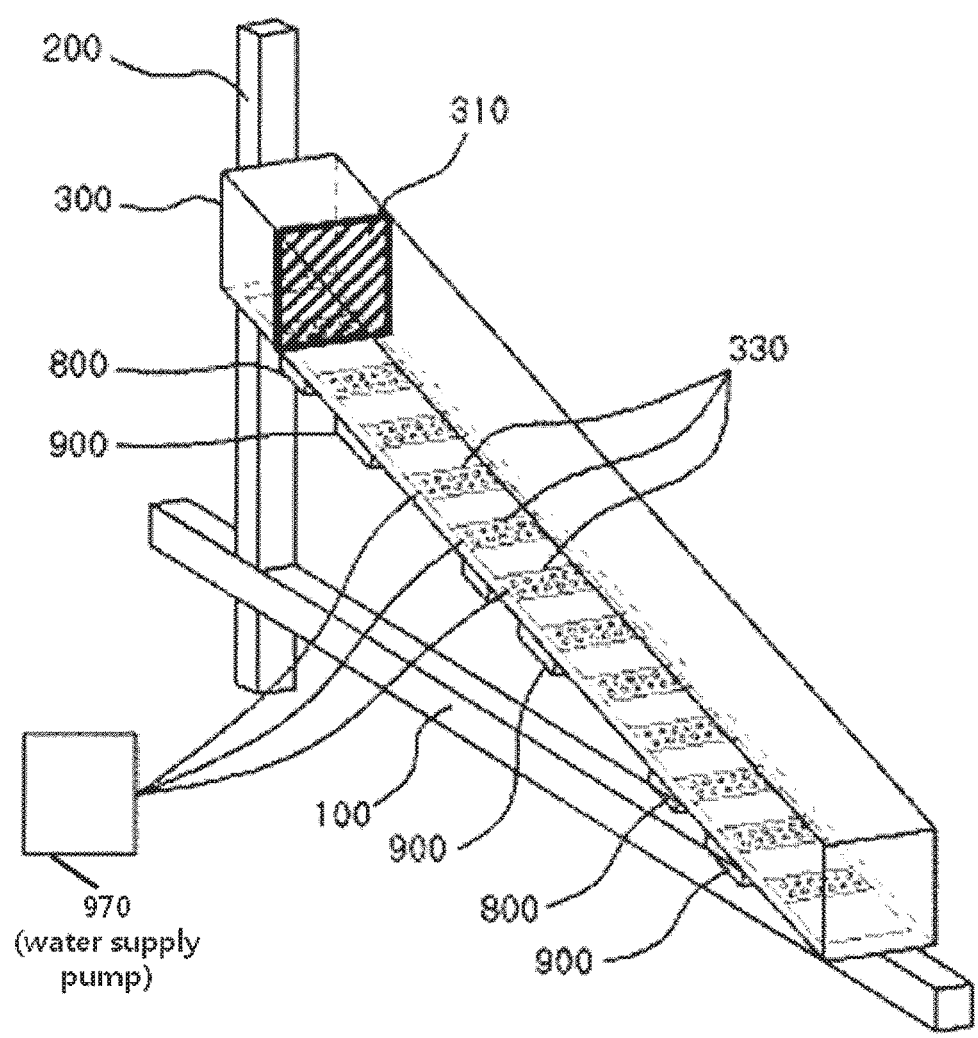
FIG. 2 is a view illustrating a first example of the construction of a hydroplaning debris-flow simulation apparatus, according to the present invention.

FIG. 2 is a view illustrating a first example of the construction of the hydroplaning debris-flow simulation apparatus according to the present invention.

As shown in FIG. 2, the hydroplaning debris-flow simulation apparatus according to the present invention includes a horizontal frame 100, a vertical frame 200 and a flume 300.

The horizontal frame 100 is disposed under the flume 300 and supports the flume 300.

The vertical frame 200 is connected at a right angle to the horizontal frame 100 and disposed at a side of the flume 300 to support the flume 300. Preferably, the vertical frame 200 is connected to one end of the flume 300, thus supporting the end of the flume 300.

The flume 300 is connected at the end thereof to the vertical frame 200 and placed on the horizontal frame 100 at a predetermined inclination angle. The flume 300 is provided with a plurality of water permeation units 330. The water permeation units 330 supply water into the flume 300 to form a water layer in the flume 300. In an embodiment, the water permeation units 330 may be installed in the flume 300 at positions spaced apart from each other in the longitudinal direction of the flume 300.

Figure 5:
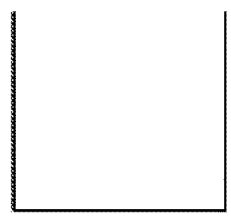
FIG. 5 is of views showing a variety of shapes of a flume used in the hydroplaning debris-flow simulation apparatus according to the present invention.
Figure 5:
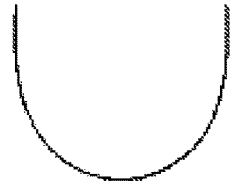
Figure 5:
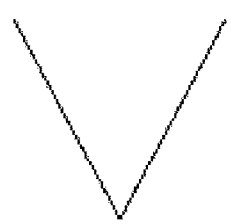
Figure 5:
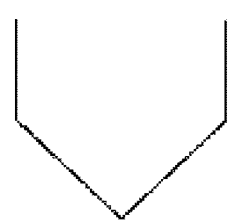
Figure 5:
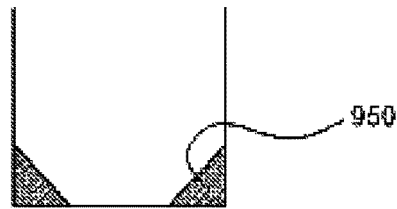

FIG. 5 is of views showing a variety of shapes of the flume of the hydroplaning debris-flow simulation apparatus according to the present invention.

As shown in FIG. 5, the cross-section of the flume 300 may be a rectangular shape (a), a semicircular shape (b), an inverted triangular shape (c) or a semi-hexagonal shape (d). Particularly, as shown in FIG. 5(e), a variety of landforms can be simulated in such a way that removable members 950 are disposed in the flume 300, for example, removable members 950 are disposed in the flume 300 having the rectangular shape (a) to form a semi-pentagonal shape (e). As shown in FIG. 2, a water-pressure gauge 800 and a load cell 900 are provided under each of upper, medial and lower portions of the bottom of the flume 300 to measure the water pressure in the flume 300 and the load of debris-flow that flows through the flume 300.

FIGS. 6a through 6d are views showing several examples of the water permeation unit of the hydroplaning debris-flow simulation apparatus according to the present invention.

Figure 6A:
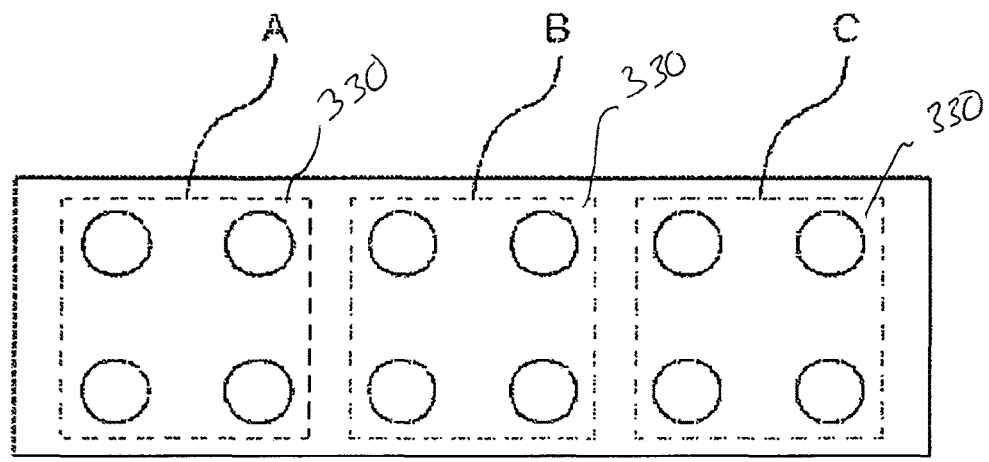

As shown in FIG. 6a, each water permeation unit 330 may include a porous plate which has a plurality of holes so that a partially-wet ground surface, the effect of variation of subterranean water or a gush-out water phenomenon can be simulated in the flume 300. Alternatively, as shown in FIG. 6c, the water permeation unit 330 may include a hollow plate that has a hollow space so that a ground surface that has absorbed water because of rainfall can be simulated in the flume 300.

Figure 6B:
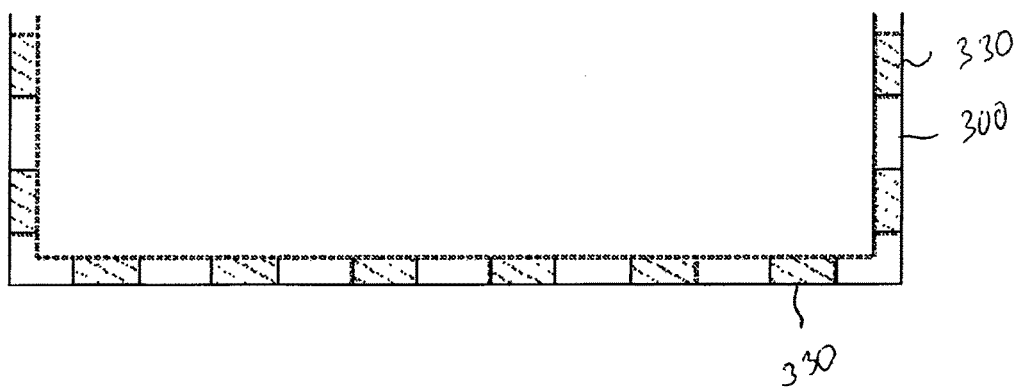

For example, in the case where the water permeation unit 330 includes a porous plate which has portions A, B and C, as shown in FIG. 6a, the water permeation unit 330 may be provided under the bottom of the flume 300 such that all of the portions A, B and C of the porous plate are disposed in the bottom of the flume 300. Alternatively, as shown in FIG. 6b, a water permeation unit 330 may be provided in the bottom and opposite sidewalls of the flume 300 in such a way that the portion A of the porous plate is disposed on the left sidewall of the flume 300, the portion B is provided under the bottom of the flume 300, and the portion C is installed on the right sidewall of the flume 300.

The water permeation unit 330 supplies water in a variety of ways so that different kinds of partially-wet ground surfaces, a variety of effects of variation of subterranean water or different kinds of gush-out water phenomenon can be simulated in the flume 300. For instance, water may be supplied into the flume 300 by holes formed in the portions A, B and C. Alternatively, the holes that are in the portions A and B may be left open while the holes formed in the portion C are closed, so that water is supplied into the flume 300 only by the holes of the portions A and B. Further, a water supply control valve 331 may be connected to each of the holes of the portions A, B and C. In this case, the amount of water that is supplied to each hole can be controlled by the corresponding water supply control valve 331.

Figure 6C:
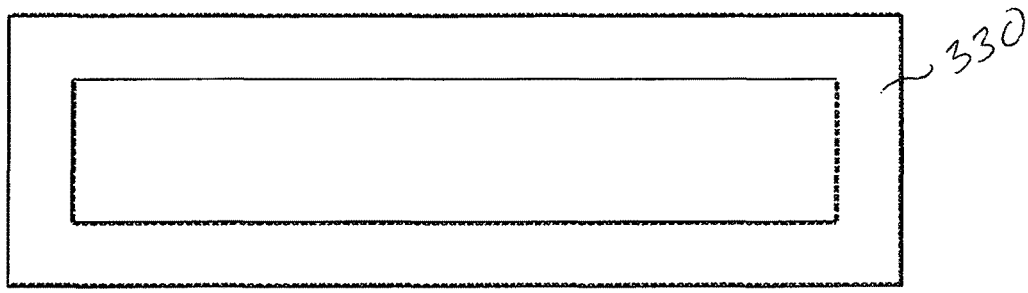

As shown in FIG. 6c, if the water permeation unit 330 includes the hollow plate, the water permeation unit 330 may be installed under the bottom of the flume 300 or, alternatively, as shown in FIG. 6d, the water permeation unit 330 may be dividedly provided such that both ends of the hollow plate are provided on the respective opposite sidewalls of the flume 300. In this case, water supply control valves 331 are respectively connected to the parts of the water permeation unit 330 that are provided on the bottom and opposite sidewalls of the flume 300 so that the amount of water that is supplied into each part of the water permeation unit 330 can be controlled by the water supply control valves 331.

Figure 7:
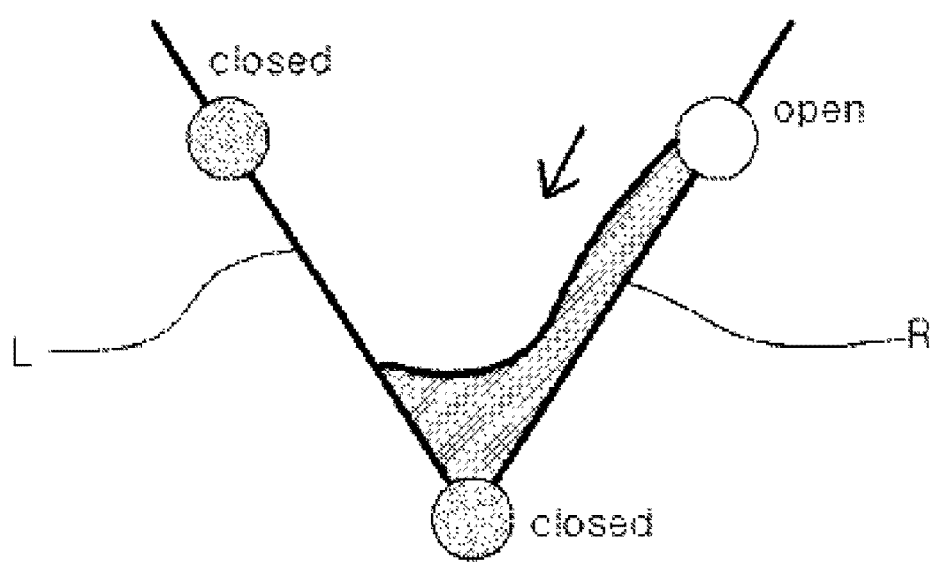
FIG. 7 is a view showing a state in which a water layer is formed by the water permeation unit of the hydroplaning debris-flow simulation apparatus according to the present invention.

FIG. 7 is a view showing a state in which a water layer is formed by the water permeation unit of the hydroplaning debris-flow simulation apparatus according to the present invention.

For example, on the assumption that the cross-section of the flume 300 is an inverted triangle and the water permeation unit 330 is provided on the bottom and opposite sidewalls of the flume 300, if water is supplied into the flume 300 only by the right side part of the water permeation unit 330, as shown in FIG. 7, the left sidewall, that is, surface L, of the flume 300 becomes a shear surface on which a shear phenomenon results from there being no supply of water, while the right sidewall, that is, the surface R, of the flume 300 becomes a plug surface on which a shear phenomenon does not occur due to the supply of water.

As shown in FIG. 2, the hydroplaning debris-flow simulation apparatus according to the present invention further includes a water supply pump 970 which is connected to the water permeation unit 330 to pump water and supply it into the flume 300.

In detail, it is preferable that the water pressure of the water supply pump 970 that supplies water into the flume 300 be controlled such that the amount of rainfall per hour ranges from 10 mm to 200 mm. The reason for using such a wide range of the amount of rainfall per hour compared to 30 mm, which is the amount of rainfall per hour at which an actual landslide warning is issued, is to simulate hydroplaning situations in consideration of the fact that conditions of the ground surface vary depending on variations in the rainfall.

As shown in FIGS. 6a and 6b, if the water permeation unit 330 comprises the porous plate, the water supply pump 970 controls the pressure of water that is supplied into each hole so that different kinds of partially-wet ground surfaces, a variety of effects of variations in the subterranean water or different kinds of gush-out water phenomenon can be simulated in the flume 300.

In the hydroplaning debris-flow simulation apparatus according to the present invention, a plurality of flumes may be provided in such a way that they are arranged in parallel in positions adjacent to each other or spaced apart from each other at regular intervals. Hereinafter, the hydroplaning debris-flow simulation apparatus in which a plurality of flumes are arranged in parallel to each other will be explained in detail. Of course, the present invention may also be configured such that the flumes are spaced apart from each other at regular intervals.

Figure 3:
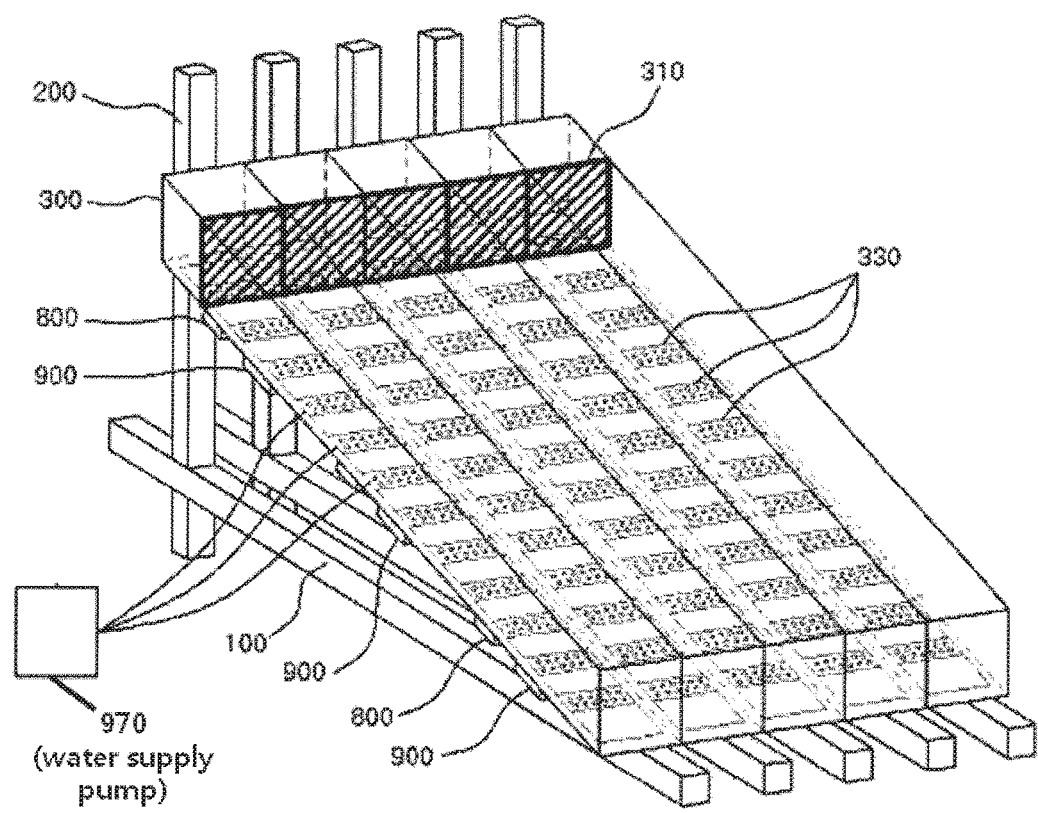
FIG. 3 is a view illustrating a second example of the construction of the hydroplaning debris-flow simulation apparatus according to the present invention.

FIG. 3 is a view illustrating a second example of the construction of the hydroplaning debris-flow simulation apparatus according to the present invention.

As shown in the second example, the hydroplaning debris-flow simulation apparatus according to the present invention may includes a plurality of horizontal frames 100, a plurality of vertical frames 200 and a plurality of flumes 300, thus forming a plurality of flow channels so that several debris-flows can be simulated at the same time.

In detail, the horizontal frames 100 are disposed under the respective flumes 300 to support the corresponding flumes 300. Each vertical frame 200 is perpendicularly connected to the corresponding horizontal frame 100 and is disposed at a side of the corresponding flume 300 to support the flume 300.

Each flume 300 is connected at one end thereof to the corresponding vertical frame 200 and placed on the corresponding horizontal frame 100 at a predetermined inclination angle. The opposite sidewalls of the flumes 300 are connected one after another such that the flumes 300 are inclined on the horizontal frames 100 at the same angle, thus forming the flow channels.

As stated above, each flume 300 may be provided with a plurality of water permeation units 330. The water permeation unit 330 includes a porous plate which can simulate a partially-wet ground surface, the effect of variations in the subterranean water or a gush-out water phenomenon in the flow channel, or a hollow plate which can simulate a wet state of the ground surface because of rainfall. The water permeation units 330 are disposed at positions spaced apart from each other in the longitudinal direction of the flume 300.

Among the flumes 300, at least one flume 300 may be provided with the water permeation units 330 that simulate the same conditions or with different kinds of water permeation units 330 that are combined to simulate different conditions. For instance, the water permeation units 330 which include only the porous plates, or the water permeation units 330 which include only the hollow plates, or the water permeation units 330 which include a combination of the porous plates and the hollow plates may be installed on a single flume 300.

Furthermore, a gate 310 may be provided in each flume 300 to control the discharge of debris-flow. In an embodiment, the gates 310 may be disposed at different positions in the flumes 300.

Figure 4:
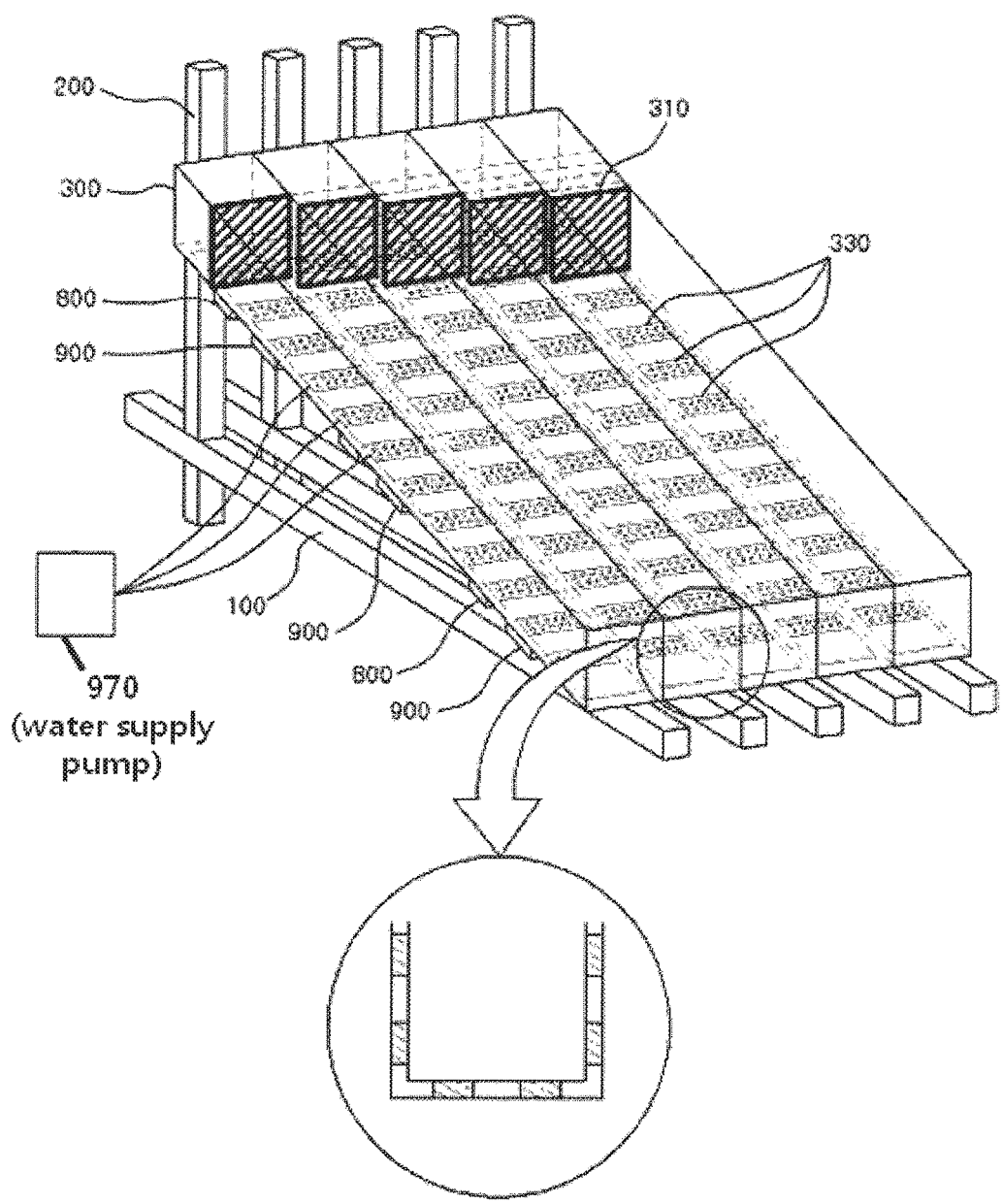
FIG. 4 is a view illustrating a third example of the construction of the hydroplaning debris-flow simulation apparatus according to the present invention.

FIG. 4 is a view illustrating a third example of the construction of the hydroplaning debris-flow simulation apparatus according to the present invention.

In detail, as shown in FIG. 4, the gates 310 can be installed in the respective flumes 300 at different positions, so that the amount of debris-flow that is drawn into each flume 300 can be adjusted. As such, the amount of debris-flow that is drawn into each flume 300 can be individually controlled by adjusting the installation position of the corresponding gate 310. Hence, the flow rate of debris-flow depending on the amount of debris-flow and the distance that the debris-flow moves can be measured.

Each flume 300 does not necessarily include a gate 310 that controls the discharged debris-flow. In this case, debris-flow is directly supplied into the flume 300.

Figure 8A:
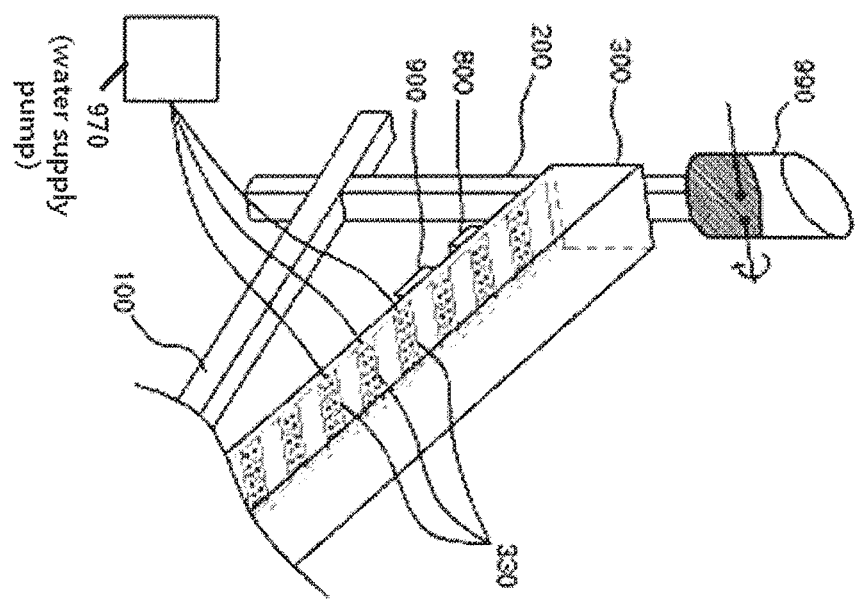
FIG. 8a is of views illustrating a fourth example of the construction of the hydroplaning debris-flow simulation apparatus according to the present invention.
Figure 8A:
Figure 8A:
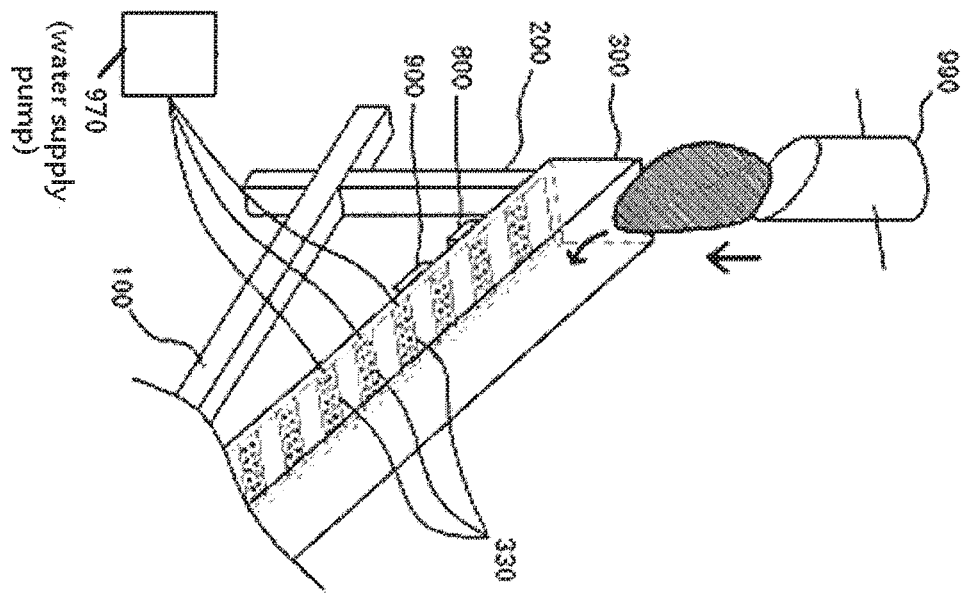
Figure 8B:
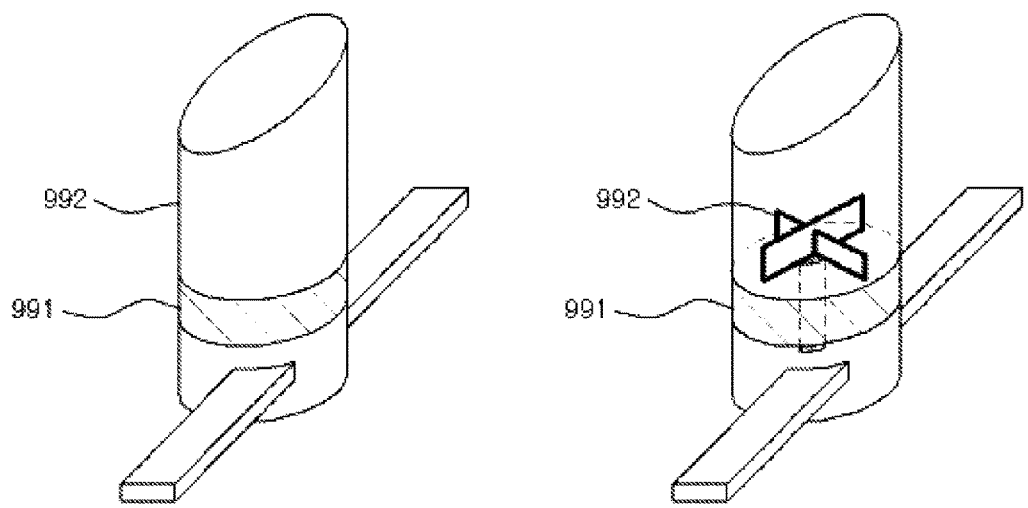

FIG. 8a is of views illustrating a fourth example of the construction of the hydroplaning debris-flow simulation apparatus according to the present invention. FIG. 8b is of views showing the construction of a debris-flow supply unit shown in FIG. 8a.

In detail, as shown in FIG. 8a, a debris-flow supply unit 990 is disposed above the flume 300 and stores debris-flow therein. When the debris-flow supply unit 990 turns upside down, the debris-flow that has been stored therein drops downwards into the flume 300.

Referring to FIG. 8b, the debris-flow supply unit 990 includes a motor 991 and a vane type rotary mixer 992. Typically, depending on the size of sample particles, a sedimentation phenomenon may occur in a short amount of time, thus causing the mixed state of the sample to be non-uniform. To avoid this, the vane type rotary mixer 992 sufficiently agitates the sample just until the sample drops into the flume 300, so that the sample can be maintained in the homogeneous state.

Figure 9:
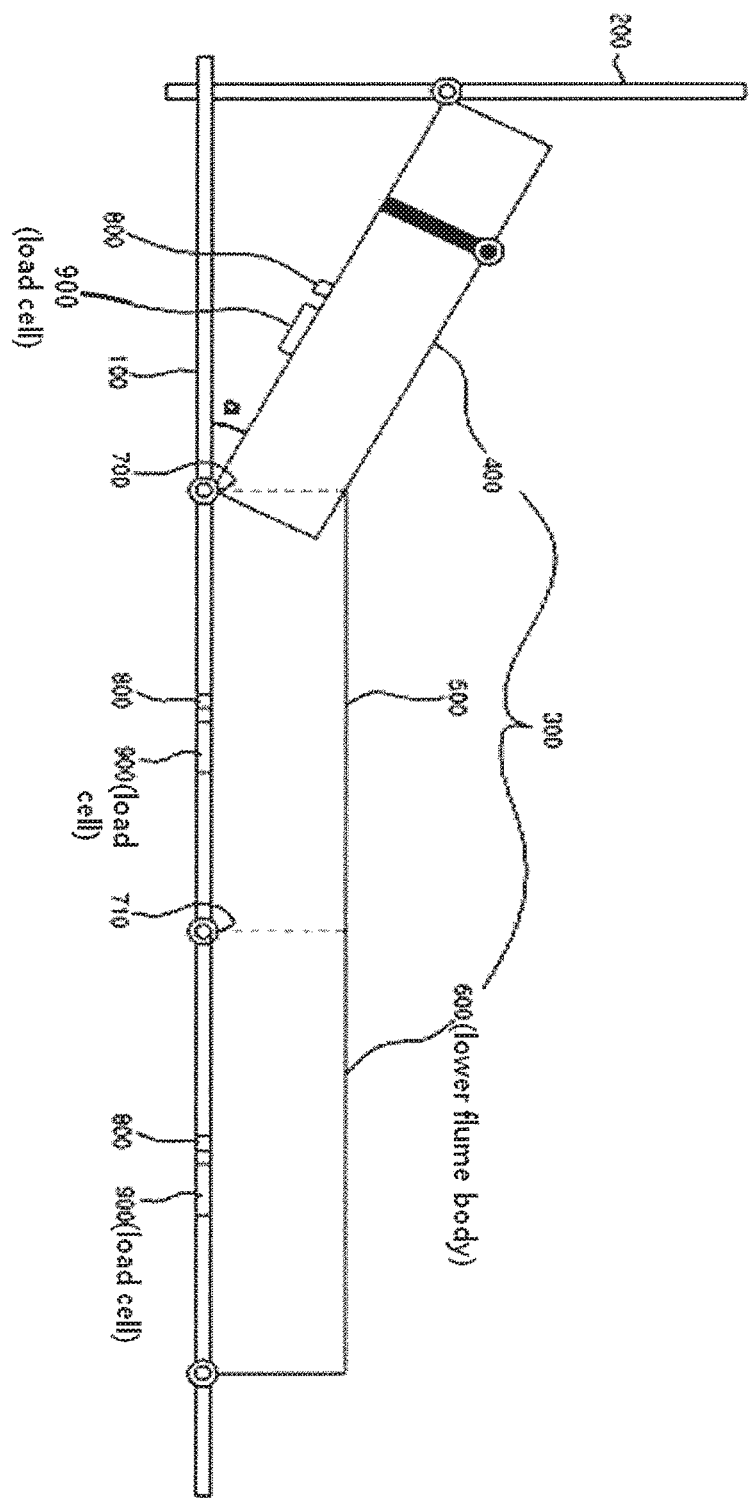
FIG. 9 is a side view showing a modification of the flume of the hydroplaning debris-flow simulation apparatus according to the present invention.

FIG. 9 is a side view showing a modification of the flume of the hydroplaning debris-flow simulation apparatus according to the present invention.

In the hydroplaning debris-flow simulation apparatus according to the present invention, each flume 300 may have an integrated structure. Alternatively, as shown in FIG. 9, each flume 300 may be configured such that a plurality of flume bodies are connected to each other in the longitudinal direction. In this case, the heights of the bodies of the flume 300 can be adjusted so that the angle of inclination of each body can be changed. Further, the width or length of each body of the flume 300 may be changed. In an example of FIG. 9, the flume 300 includes three separate flume bodies, that is, an upper flume body 400, a medial flume body 500 and a lower flume body 600 which are connected to each other in the longitudinal direction.

In detail, the upper flume body 400 is installed on the horizontal frame 100. A first end of the upper flume body 400 is connected to the vertical frame 200 so as to be slidable along the vertical frame 200. Thus, the angle of inclination of the upper flume body 400 can be changed by sliding the upper flume body 400 along the vertical frame 200.

For instance, a rail wheel (not shown) may be provided on the first end of the upper flume body 400 that is connected to the vertical frame 200, and a guide rail (not shown) that corresponds to the rail wheel may be provided on the vertical frame 200. In this case, the angle of inclination of the upper flume body 400 can be changed in such a way that the rail wheel slides along the guide rail upwards or downwards and is fixed at a predetermined position.

The medial flume body 500 is installed on the horizontal frame 100, and a first end of the medial flume body 500 is connected to a second end of the upper flume body 400 by a connector 700. The angles of inclination of the upper and medial flume bodies 400 and 500 can be adjusted by vertically moving the connector 700.

In detail, the connector 700 is disposed on the horizontal frame 100. A lift unit 110 is provided on the horizontal frame 100 at a predetermined position corresponding to the connector 700 so that the lift unit no vertically lifts the connector 700, thus adjusting the angles of inclination of the upper and medial flume bodies 400 and 500.

The lower flume body 600 is installed on the horizontal frame 100, and a first end of the lower flume body 600 is connected to a second end of the medial flume body 500 by a connector 710. A second end of the lower flume body 600 and the connector 710 that connects the medial flume body 500 to the lower flume body 600 are disposed on the upper surface of the horizontal frame 100.

All of the upper flume body 400, the medial flume body 500 and the lower flume body boo may vary in width. Particularly, the medial flume body 500 and the lower flume body 600 may vary in length. To embody the length variable structure, each of the medial and lower flume bodies 500 and 600 may comprise multi-stage sliding members that can longitudinally slide in multi-stages, thus varying in length.

Hereinafter, a method of manufacturing the hydroplaning debris-flow simulation apparatus according to the present invention will be described in detail.

Figure 10:
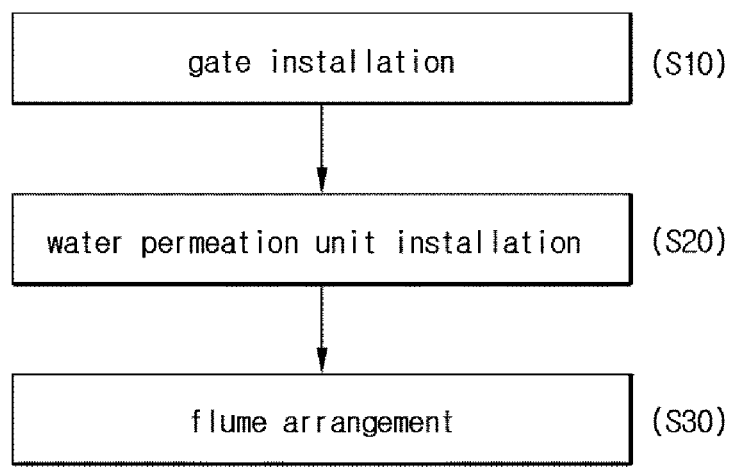
FIG. 10 is a block diagram illustrating a method of manufacturing the hydroplaning debris-flow simulation apparatus according to the present invention.

FIG. 10 is a block diagram illustrating the method of manufacturing the hydroplaning debris-flow simulation apparatus according to the present invention.

As shown in FIG. 10, the method of manufacturing the hydroplaning debris-flow simulation apparatus according to the present invention includes a gate installation step S10, a water permeation unit installation step S20 and a flume arrangement step S30.

At the gate installation step S10, the gates that control discharge of debris-flow are installed in the respective flumes at different positions.

At the water permeation unit installation step S20, the water permeation units are installed in each flume at positions spaced apart from each other in the longitudinal direction.

At the flume arrangement step S30, the flumes are installed such that they are inclined at a predetermined angle and are arranged in parallel at positions adjacent to each other or spaced apart from each other at regular intervals.

Hereinafter, a method of simulating debris-flow using the hydroplaning debris-flow simulation apparatus according to the present invention will be explained in detail.

Figure 11:
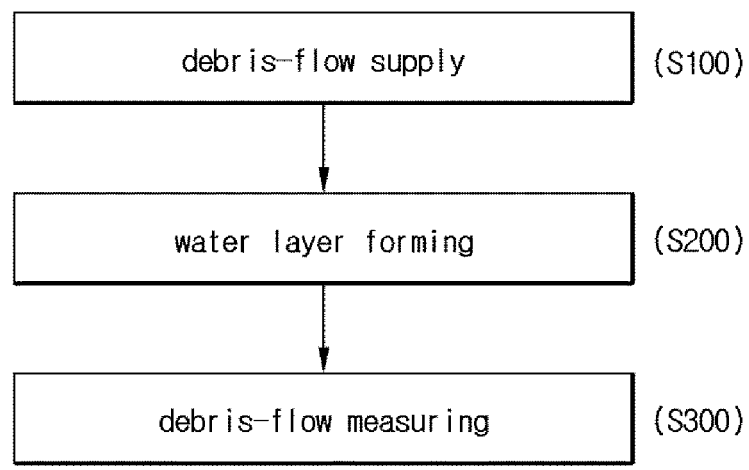
FIG. 11 is a block diagram illustrating a method of simulating a landslide according to the present invention.

FIG. 11 is a block diagram illustrating a method of simulating a landslide, according to the present invention.

As shown in FIG. 11, the landslide simulation method according to the present invention includes a debris-flow supply step S100, a water layer forming step S200 and a debris-flow measuring step S300.

At the debris-flow supply step S100, debris-flow is supplied into the flumes, each of which has the gate at a different position and the water permeation units.

At the water layer forming step S200, water is supplied into the water permeation units, thus forming water layers in the flumes.

The water layer forming step S200 may be conducted before the debris-flow supply step S100.

At the debris-flow measuring step S300, the gates open at the same time, and the flow rate of debris-flow depending on the amount of debris-flow, the distance that the debris-flow moves, and the state of the debris-flow attributable to hydroplaning are measured.

As described above, in a hydroplaning debris-flow simulation apparatus according to the present invention, water is supplied into a flume so that formation of a water layer can be simulated in the flume. Depending on how water is supplied, a partially-wet ground surface, the effect of variations in subterranean water, and a gush-out water phenomenon can be simulated in the flume, or a ground surface wet because of rainfall can be simulated. Therefore, the apparatus of the present invention can create conditions like those of an actual debris-flow.

Although the embodiments of the hydroplaning debris-flow simulation apparatus according to the present invention have been disclosed with reference to the drawings, those skilled in the art will appreciate that various modifications, additions and substitutions are possible, without departing from the scope and spirit of the invention as disclosed in the accompanying claims.

What is claimed is:

1. A hydroplaning debris-flow simulation apparatus, comprising an inclined flume,
   a debris supply unit disposed above the inclined flume wherein the debris supply unit stores debris therein and supplies debris into the flume;
   a gate located between the debris supply unit and the flume that is operated to control the amount of debris supplied to the flume;
   the flume comprising a plurality of water permeation units,
   wherein the plurality of water permeation units are provided in the bottom and opposite sidewalls of the flume,
   wherein the water permeation units are provided in each of the flumes at positions spaced apart from each other in a longitudinal direction of the flume,
   wherein each of the water permeation units comprises a porous plate or a hollow plate, and
   wherein water supply control valves are respectively connected to parts of the water permeation units that are provided on the bottom and opposite sidewalls of the flume so that amount of water that is supplied into each part of the water permeation unit can be controlled by the water supply control valves wherein the water mixes with the debris supplied to the flume to simulate a wet ground surface.

2. The hydroplaning debris-flow simulation apparatus as set forth in claim 1, wherein the flume comprises a plurality of flumes arranged at positions spaced apart from each other at regular intervals or parallel to each other.

3. The hydroplaning debris-flow simulation apparatus as set forth in claim 2, wherein the flumes respectively comprise a plurality of gates provided at different positions in the flumes, each of the gates controlling discharge of debris-flow.

4. The hydroplaning debris-flow simulation apparatus as set forth in claim 3, wherein each of the flumes comprises
   a water-pressure gauge or a load cell provided on each of an upper portion, a medial portion and a lower portion of a bottom of the flume, the water-pressure gauge measuring a water pressure in the flume, the load cell measuring a load of the debris-flow.

5. The hydroplaning debris-flow simulation apparatus as set forth in claim 3, wherein the water permeation units are provided in each of the flumes at positions spaced apart from each other in a longitudinal direction of the flume.

6. The hydroplaning debris-flow simulation apparatus as set forth in claim 3, further comprising
   a water supply pump coupled to the water permeation units, the water supply pump supplying water to the water permeation units so that the water is drawn into the flume.

7. The hydroplaning debris-flow simulation apparatus as set forth in claim 3, wherein each of the water permeation units comprises a porous plate or a hollow plate that supplies water into the flume only through a predetermined open portion, and
   the water permeation units have a same structure and are provided in at least one of the flumes.

8. The hydroplaning debris-flow simulation apparatus as set forth in claim 3, wherein each of the water permeation units comprises a porous plate or hollow plate that supplies water into the flume only through a predetermined open portion, and
   the water permeation units having different structures are combined in at least one of the flumes.

* * * * *